Figure 1:
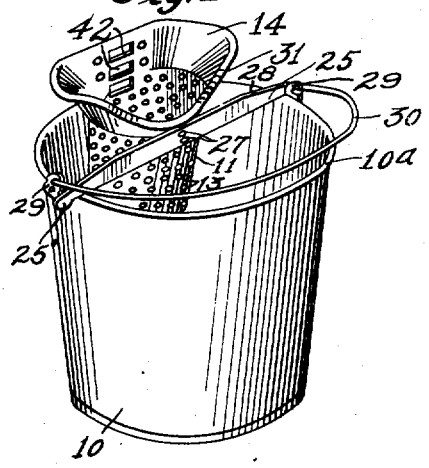

July 29, 1930. S. SCHULMAN Re. 17,754

MOP WRINGER

Original Filed June 6, 1924

INVENTOR
SOLOMAN SCHULMAN, DECEASED
By LEO FREEDMAN, ASSIGNEE
By Curtis D. Larrabee
his Att'y.

Reissued July 29, 1930 Re. 17,754

UNITED STATES PATENT OFFICE

SOLOMON SCHULMAN, DECEASED, LATE OF NEW YORK, N. Y., BY LEO FREEDMAN, OF LOS ANGELES, CALIFORNIA, ASSIGNEE

MOP WRINGER

Original No. 1,652,800, dated December 13, 1927, Serial No. 718,259, filed June 6, 1924. Application for reissue filed December 13, 1929. Serial No. 413,879½.

The invention relates to appliances for squeezing a substantial proportion of the liquid from wet fabrics or other liquid absorbing substances, and is concerned primarily with mop wringers, wash wringers and the like.

It is an object of the invention to provide a practical wringer of simple, durable, and inexpensive construction which shall eliminate the use of gearing or other rotating parts likely to become out of order.

Another object is to provide a wringer of the above type, the operation of which shall be speedy, which shall require little or no effort to squeeze the mop or other fabric to a substantial degree of dryness without injury thereto or to the supporting pail or bucket, and which shall operate without splashing or likelihood of up-setting.

A desirable embodiment of the invention includes a drain cup perforated in its bottom and sides, substantially in the manner of a sieve and rigidly fixed upon a pail while in use. Preferably the drain cup is of frustoconical form, so that the fabric is subjected to a wedging action when pressed toward the reduced bottom thereof, thus forcing out some of the water, the slope of the side walls and the depth of the drain cup being such that the mop rag or other fabric to be wrung will not become jammed into the cup above the bottom, but pressure applied thereto will be exerted against the bottom and side wall of the drain cup, so that the drain apertures afford direct and easy escape of the water released adjacent each locality of pressure.

According to a preferred feature there is provided the drain cup with a fulcrum or hooking element for coaction with a presser element between which and the cup, the fabric is to be squeezed by force applied with substantial leverage through an operating handle which compresses the fabric by urging the presser element about said fulcrum as an axis. In the preferred embodiment, the parts are so proportioned that the handle element extends obliquely upward when the pressure is applied at the fulcrum, so that the user by resting thereon without any affirmative application of force, and without any substantial movement of the handle, will apply a substantial pressure against the fabric through the presser element for the purpose desired.

In the preferred application to mop wringers, the mop head is preferably provided at each end with an upstanding gripping or hooking edge for coaction with the fulcrum element on the drain cup, so that the mop can be squeezed dry after application to the drain cup by pressing downward on the obliquely extending handle.

The drain cup is preferably provided with an integral flaring, generally oval rim and the anchoring or fulcruming aperture is arranged at the end of the minimum diameter of the rim, at which the drain cup is preferably sustained on the supporting bucket or pail. By this arrangement, the mop rag which would naturally be introduced into the drain cup with its width along the length of the maximum diameter of the rim, would have to be turned through an angle of about 90 degrees, to effect a purchase at the fulcrum aperture prior to applying the relatively intense wringing pressure. This preliminary rotation brings about a removal of excess water and preliminary compacting of the rag to avoid splashing in the final wringing operation.

According to another feature, the drain cup is provided with a supporting brace bar rigid therewith and tangent thereto at a point of the rim opposite the fulcrum, said brace bar extending substantially diametrically across the supporting bucket or pail so that the final pressure would be applied substantially directly downward on the bucket or pail.

According to another feature of the invention, clamping members are employed for removably attaching the drain cup to the edge of a pail or bucket in such a manner that the pail will not be injured by repeated secure application of the clamping means and more especially in which the clamping screw will not bind directly against the pail, but will exert its clamping pressure through a member of larger surface.

Another feature of the invention is the provision of a mop head, so constructed that a mop may be readily attached or removed and with which there is no tendency of the mop strands to tangle about the head.

This application is a continuation in part of applications, Serial No. 529,200, filed Jan. 14, 1922, and Serial No. 663,346, filed September 18, 1922, which have been abandoned in view of the issuance of Patent No. 1,652,800 for the reissue of which this application has been filed.

In the accompanying drawings in which is shown one of the various possible embodiments of the several features of this invention.

Figure 2:
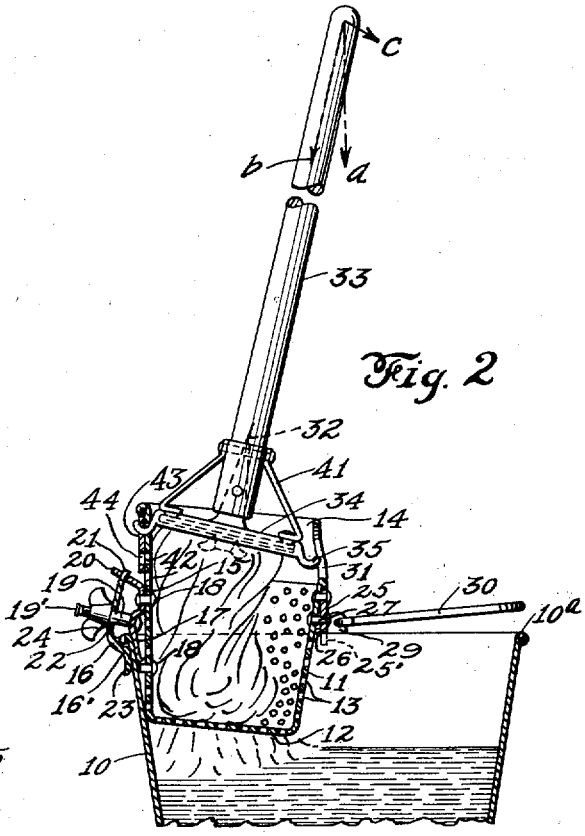
Figure 4:
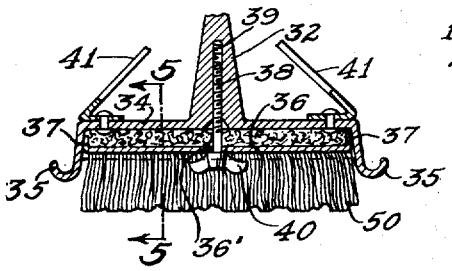
Figure 5:
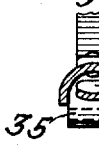
Figure 3:
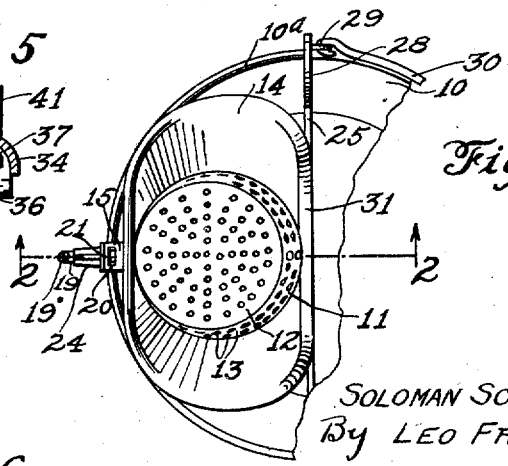
Figure 6:
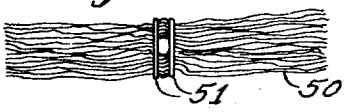

Fig. 1 is a perspective view of a pail with the drain cup applied thereto,

Fig. 2 is a fragmental sectional view on a larger scale, taken along the line 2—2 of Fig. 3, illustrating a preferred method of use and showing the mop wringing position, Fig. 3 is a fragmentary plan view of Fig. 1, Fig. 4 is a fragmentary vertical sectional view through the mop head, Fig. 5 is a sectional view taken along the line 5—5 of Fig. 4, but with the mop rag removed, and Fig. 6 is an elevation of the mop rag apart from the head and on a smaller scale.

Similar reference characters refer to similar parts throughout the several views of the drawings.

Referring now to the drawings, there is shown a pail or bucket 10 having the usual bead 10ª of conventional form and with the preferred form of drain cup applied thereto. The drain cup comprises preferably an integral cup-shaped stamping including a frusto-conical side 11 and a base 12 of substantial area. The cup has a multiplicity of contiguous small drain apertures 13 through its bottom, and side wall substantially in the manner of a sieve. Preferably the perforated drain portion of the drain cup has a volume somewhat greater than that of the mop or other fabric to be wrung.

The drain cup is provided with a substantially imperforate flaring ovoidal rim portion 14, the flare or slope of the rim wall along the maximum diameter being at a wider angle than along the minimum diameter, where the inner walls are nearly vertical.

For securing the drain cup to the pail, there is provided a pair of cooperating clamping members 15, 16, the member 15 being riveted to the exterior of the drain cup. The lower portion 17 of the member 15 between the rivets 18 is spaced from the cup to lie flat against the inner surface of the pail, throughout a portion of its length and carries a bolt 19 projecting outward therefrom above the edge of the pail. The upper end of member 15 also extends outwardly and has a rectangular slot at 20 to accommodate the tongue 21, at the upper end of the complementary clamping member 16. The member 16 is formed with a hole 22 loosely receiving the bolt 19, and terminates in an inwardly curved lower clamping end 23, adapted to engage the exterior of the pail or bucket below the bead 10ª. Tightening of a wing nut 24 on the bolt 19 will urge the clamping member 16 into clamping position, the pail being clamped between members 15 and 16, the latter member fulcruming in the aperture 20. Preferably the end of bolt 19 is upset as at 19′ to prevent escape of wing nut 24 or of clamping plate 16. Inasmuch as both of the members 15 and 16 are formed of flat stock, repeated clamping of the wringer attachment to the pail will not dent or weaken or otherwise injure the sides of the pail.

Preferably a horizontal brace bar 25 is riveted to the drain cup tangent to the side thereof, at a point diametrically opposite the clamping member 15. In order to insure disposition of the bar in a vertical plane, with its lower horizontal edge resting on the top of the pail or bucket, when in applied position, a spacer washer 26 is interposed between lower rivet 27 and the bar.

Both the bar 25 and the clamping member 15 are secured to the drain cup below the rim, preferably by riveting through drain openings that would otherwise serve as drain apertures so that the cup is spaced well above the bottom of a pail to which it is applied. The ends of the cross brace 25 are oblique at their upper edges, as indicated at 28, and are disposed respectively on opposite sides of the anchores 29 for the bail 30 of the bucket. The ends 28 of the bar 25 thus afford sufficient clearance for the bail 30, so that the latter will normally rest at a small inclination above the rim of the pail, (Fig. 1) whereby it may be readily grasped when the pail is to be carried in the course of use. Preferably the ends of cross brace 25 have integral downward lugs 25′ at the ends of the lower edge thereof, which straddle the bucket or pail and prevent the end of the brace from shifting beyond the rim of a large pail, when wringing pressure is applied, assuming that the clamp is not rigidly secured to the pail.

To facilitate lifting of a mop from the pail into the drain cup, the inner side of the rim is formed with a relatively deep cutaway portion 31, which permits the mop to be inserted in the cup without lifting it to any great distance above the pail.

It will be noted with particular reference to Fig. 2 that when the clamps 15 and 16, and the brace bar 25 are in operative drain cup supporting position the axis of the drain cup is tilted a little from the vertical and the lower edge of the cup may just contact the inner surface of the pail below the clamping members. The drain apertures nearest the pail are thus not sealed by the pail wall, and will drain as effectively as the other apertures.

The mop wringer disclosed comprises a metallic mop head having a spike 32 for application to the usual handle 33. The head has an elongated cross-piece 34 of channel form, shown arcuate in cross-section, having integral hook conformations 35 extending downward from the ends thereof. The complementary clamp member for the head comprises a relatively thin clamping strip 36 fitting into the channel head piece 34 to be straddled thereby, and extending substantially from one end to the other thereof, said strip having its ends 37 turned at right angles and lying closely adjacent the inner faces of the hooks 35. A pointed screw 38 extending through a central aperture 36′ in the strip 36, works in a socket 39 in the spike and may be manually turned by the wing nut head 40 to urge the clamping member into the channel member 34. The strip 36 being centered between hook conformations 35, the aperture 36′ is aligned with the socket 39 so that the screw will readily enter the same in assembly. Angular brace bars 41 connecting the handle and the channel cross-brace may be made of relatively light material.

It may be noted that the clamping member 36 offers a relatively long clamping surface extending from end to end of the mop head, since the turned up ends 37 occupy very little space. The head would, therefore, be only little wider than the mop rag. The securing device 38, 40 is normally concealed by the mop rag 50 when the latter is in applied position. The securing device is too close to the head to interfere in any way with the mopping operation. There are no projecting screws or fastenings above the mop head about which the mop strands are likely to become twisted or tangled and the angular brace bars 41 act as a guard yoke to prevent the strands from winding about the handle.

The rim of the drain cup is preferably provided with fulcrum means, such as rectangular fulcruming apertures 42 at one side of its minimum diameter and preferably directly above the clamping member 16, a plurality of said apertures being provided at different elevations for accommodating mop rags of different volumes.

The walls of the fulcruming apertures which are located near the peripheral margin of the cup rim may be strengthened in convenient manner. There is shown a relatively heavy reinforcing plate 43 secured by any suitable means upon the outer face of the rim for this purpose. The reinforcing plate is formed with apertures 44 registering with the two upper fulcruming apertures 42 in the rim. The lower edge of the plate aligns with the upper wall of the lowermost opening to strengthen the same. The wringer attachment is adapted for use with all classes of buckets and tubs. For purposes of more firmly securing the same upon a relatively thick wooden bucket, having no bead for cooperation with the clamping member 16, may be provided this member with burrs or teeth 16′ on its inner face.

In Fig. 6 is shown a mop rag particuluarly suited to the mop head construction above described. This mop rag instead of having the usual central encircling band securing the strands of the mop, is provided with a pair of such bands 51 secured preferably by stitching, one at each side of the center so as not to interfere with the use of the screw 38. The strands between the bands become relatively separated and bulged in use as indicated so that there is no stiff bundle of strands to oppose the passage of the screw therethrough.

The mop wringer occupying but half of the width of the pail or bucket, it will be seen that in operation, ample room is left at the unoccupied diameter of the pail beyond the bracing bar 25, for insertion of the mop. In the wringing operation, the rag would naturally be introduced into the drain cup with its greatest width along the greatest diameter of the rim, whereupon the handle 33 would be rotated about its axis through about 90 degrees to bring one of the hook ends 35 of the mop head into alignment and into engagement with one of the fulcruming apertures 42 depending on the size of the mop rag. The mop is of such size relative to the volume of the drain cup that the mop head would naturally be inclined slightly downward from the fulcruming aperture and the mop handle at right angles to the mop head, would be inclined toward the central axis of the pail, as shown. Thereupon the porter or maid need merely grip the handle and rest the weight of the body thereon to force the handle downward without need for exerting any affirmative or fatiguing pull or push. By reason of the frusto-conical form of the drain cup, the fabric is thus subjected to a wedging and squeezing action. Moreover, the downward force indicated by the arrow *a* will resolve itself into two components, indicated by arrows *b* and *c*. The component *b* along the handle will exert a direct downward force against the mop, the other component *c* is applied to the force end of a lever, the fulcrum of which is at 35, and the work of which is the resistance of the mop rag 50 below the head, so that by reason of the relatively great length of the handle, compared to the much shorter length between the fulcrum and the point of application of the work, a substantial pressure will be added to the direct force applied to the mop rag by component *b*, to press the mop rag with substantial force against the bottom and sides of the drain cup for removing substantially all of the water from the rag, leaving it damp rather than wet.

In this operation, it will be seen that the downward force is applied directly above the bottom of the pail, and there is no substantial rotary component tending to upset the pail, as there might be if the mop handle were moved through a substantial range of rotary displacement about the fulcrum in the wringing operation. It will also be seen that the substantial strain applied in this operation is taken by the brace bar 25, applying a compressive force directly upon the pail or bucket, which it is, of course, well able to resist, wholly avoiding normal pressure against the lateral surface that would be likely to distort, buckle or destroy the pail.

Furthermore, the engagement of the lower edge of the cup with the inner face of the bucket below the fulcrum serves to effectively brace the cup against any transverse strains incident to a mop wringing operation, even though the nut 24 of the clamping members 15, 16, be not completely tightened.

In the lever action by which the rag is squeezed dry, it will be seen that the drain cup will be maintained in position even should the clamp 15—16 be not completely tightened, since the thickened bead $10^a$ will prevent the clamp from being lifted above the rim of the pail.

It will be seen that in the preliminary rotary operation to bring the mop head hook into alignment with the fulcruming anchor of the drain cup, the mop rag is preliminarily twisted, to preliminarily compact the same and to force out excess water, so that the pressure applied in the final leverage operation is distributed throughout the mass of the compacted rag, the water escaping from all portions thereof rather than from a restricted portion thereof only. Moreover, this preliminary twisting operation eliminates the possibility of splashing which might be encountered if high pressure were suddenly applied to a very wet rag.

It might be noted that while the drain cup is supported well above the mouth of the bucket to provide an ample height of water in the pail below the bottom of the drain cup and that some of the drain apertures are above the bucket rim, there is little danger of splashing water on the floor because of the recess 31 at the inner side of the rim and the fact that the pressure is applied to the mop only after much of the water has been pressed out in the twisting operation incident to adjusting the mop head at the fulcrum slot.

The drain cup, it will be seen, provides a continuous smooth surface without sharp protuberances of any sort into the interior thereof, so that there is nothing likely to catch, bind, jam or tend to tear or destroy the mop rag.

The invention is applicable not only to the mop rag as set forth, but can be used for wringing the water from clothing and other fabrics before hanging the same to dry. In this application, the clothing would first be deposited into the drain cup and pressure would be applied by means of a presser element, such as the element 33 and the leverage principle may be applied, substantially as set forth in the operation above, or the clothing fabric may be clamped in lieu of a mop rag in a construction similar to the mop head shown and the operation may proceed as set forth above.

It will be seen that the operation is expeditious and requires little or no effort, yet effects removal of substantially all of the water without injury to the fabric.

It will be thus seen that there is herein described apparatus in which the several features of this invention are embodied, and which apparatus in its action attains the various objects of the invention and is well suited to meet the requirements of practical use.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

Having thus described the invention, what is claimed as new and desired to be secured by Letters-Patent of the United States is:—

1. A wringer comprising a drain cup having an oval rim with fulcrum means at one end of the minimum diameter of said rim, in combination with a presser member adapted to have a mop mechanically attached thereto, said presser member being of a size to readily turn within the oval rim and having a hook portion at one end thereof for engagement of the fulcrum, whereby in operation, the presser member would be inserted into the cup along the maximum diameter thereof, and turned through a right angle to engage the fulcrum.

2. As an article of manufacture, a mop wringer including a unitary frusto-conical drain cup, perforated both at the bottom and at the side thereof and having a flared ovoidal rim portion, said rim having fulcrum means at its narrowest width.

3. A mop wringing attachment for pails, buckets, and the like, comprising a frustro-conical drain cup perforated both at the bottom and at the sides thereof, having a flared ovoidal rim section, and means for attaching the cup to the edge of a pail with the rim disposed above the pail, said rim having a relatively deep cut away portion at the side opposite said attaching means and having fulcrum means at the side opposite said cut away portion.

4. A mop wringer attachment for buckets and the like, including a drain cup, a relatively fixed clamping member carried by the drain cup and engageable with the inner face of a bucket, a bolt carried by said member and extending outwardly over the edge of the bucket, a nut on said bolt, a relatively movable clamping member guided on the bolt to be urged inward into engagement with the exterior of the bucket by tightening of the bolt nut, said movable clamping member having an inwardly curved lower end to engage the bucket below the rim or rim bead thereof.

5. A mop wringer attachment for buckets and the like, including a drain cup, a relatively fixed clamping member carried by the drain cup and engageable with the inner face of a bucket, a bolt carried by said member and extending outward over the edge of a bucket, a nut on said bolt, a relatively movable clamping member guided on the bolt to be urged inward into engagement with the exterior of a bucket by tightening the bolt nut, said fixed clamping member including an outwardly projecting apertured upper end, the said movable member including a tongue fulcruming in the apertured end of the fixed member and an inturned lower end to engage the outer surface of the bucket below the rim or rim bead thereof.

6. As an article of manufacture, a mop wringer including a frusto-conical drain cup, perforated both at the bottom and at the side wall thereof and having a rim section above the perforations of the side walls, said rim section having fulcrum means provided on one of the sides thereof, and a horizontal cross-bar tangential to the opposite end of the fulcrum means, and rigid with the drain cup for resting upon the rim of a pail, bucket or the like, to support the drain cup for use.

7. The combination set forth in claim 6 in which the drain cup has a hook contiguous to the fulcruming means to straddle the rim of the supporting pail or bucket.

8. A mop wringer comprising a drain cup having a bottom of substantial area and a rim portion and perforated both at the bottom and the side thereof, a clamp structure associated with said cup for attaching the same to the side wall of a pail or bucket, fulcrum means in said rim portion substantially directly above the area of contact of the cup and the pail or bucket, and a cross bar secured tangentially to said cup at the side directly opposite said fulcrum means for resting upon the rim of the pail or bucket.

9. A wringer comprising a drain cup, a rim on said cup and fulcrum means in said rim, in combination with a presser member adapted to have a mop mechanically attached thereto, a hook on one end of said presser member to engage said fulcrum means to effectively bring pressure to bear onto said mop when said presser member is forced downward.

10. A mop wringer comprising a perforated drain cup having a fulcruming aperture near its peripherial margin in combination with a mop presser adapted to fulcrum in said aperture when said presser is moved downward to squeeze water from said mop.

11. A mop wringer comprising a perforated cup, having in one of its sides fulcruming apertures at different elevations; a horizontal bar secured to the side of said cup opposite said apertures and adapted to rest on the rim of a bucket; a clamp in fixed relation to said cup and arranged to be detachably secured to the rim of a bucket; a presser member; hooks on said presser member, said hooks being adapted to fulcrum in said apertures to effectively remove water from a mop head when said presser is forced downwardly.

12. A mop wringing attachment for pails, buckets, and the like, comprising a perforated drain cup having a flared ovoidal rim section; means for mounting the cup on a pail; said drain cup having in said rim section, a relatively deep cut away portion; and having fulcrum means at its side opposite said cut away portion.

In testimony whereof, I have hereunto set my hand at Los Angeles, California, this 9th day of December, 1929.

LEO FREEDMAN,
*Assignee of Solomon Schulman, Deceased.*